United States Patent [19]

Takada

[11] Patent Number: 4,638,152
[45] Date of Patent: Jan. 20, 1987

[54] PHOTOELECTRIC CONVERTING CIRCUIT HAVING A LOW PARASITIC CAPACITANCE

[75] Inventor: Hisashi Takada, Kanagawa, Japan

[73] Assignee: Sumitomo Electric Industries, Ltd., Osaka, Japan

[21] Appl. No.: 797,500

[22] Filed: Nov. 13, 1985

[30] Foreign Application Priority Data

Nov. 13, 1984 [JP] Japan .................... 59-239095

[51] Int. Cl.⁴ .......................................... H01J 40/14
[52] U.S. Cl. ................... 250/214 A; 307/311
[58] Field of Search ............. 250/214 R, 214 A; 307/311

[56] References Cited

U.S. PATENT DOCUMENTS 3,463,928  8/1969  Murphy .................... 250/214 R
3,670,184  6/1972  Idei et al. ................. 307/311
3,984,824  10/1976  Blackburn ................. 307/311
4,516,019  5/1985  Eertink et al. ............ 307/311

Primary Examiner—David C. Nelms
Assistant Examiner—William L. Oen
Attorney, Agent, or Firm—Cushman, Darby & Cushman

[57] ABSTRACT

A bootstrap negative feedback type photoelectric converting circuit for converting an optical signal into an electrical signal. A light receiving element receives incident light and provides an electrical signal to a field effect transistor (FET) and an inverting amplifier. A bipolar transistor is directly connected to the FET in complementary fashion to increase the gain of the source-follower amplifier to substantially unity and to reduce its output impedance to a very small value in order to reduce the effects of parasitic capacitance of the light receiving element at high frequencies.

1 Claim, 10 Drawing Figures

TRANS-IMPEDANCE TYPE $|A| = 15.2$
$fc = 60\text{MHz}$

BOOTSTRAP NEGATIVE FEEDBACK TYPE $|A| = 15.2$
$fc = 83\text{MHz}$

COMPLEMENTARY BOOTSTRAP TYPE $|A| = 15.2$
$fc = 145\text{MHz}$

PHOTOELECTRIC CONVERTING CIRCUIT HAVING A LOW PARASITIC CAPACITANCE

BACKGROUND OF THE INVENTION

This invention relates generally to photoelectric converting circuits for converting optical signals into electrical signals. Such circuits are used in optical communication systems.

There is well known a feedback type transimpedance convertor, shown in FIG. 2, (PRIOR ART) as a photoelectric converting circuit.

The cathode of a light receiving element 11 is connected to the positive pole of a power supply 12 to apply a reverse bias voltage to the circuit. The anode of light receiving element 11 is connected to the input of an inverting amplifier 13. Light received by light receiving element 11 is converted into an optical output electrical signal, which is inverted and amplified by inverting amplifier 13. The output of amplifier 13 is fed back to the input of the inverting amplifier 13 through a feedback resistor 14. A parasitic capacitance 15 and an input capacitance 16 exist in the light receiving element 11 and the inverted amplifier 13, respectively as shown by a short dashes line in FIG. 2.

Given a voltage amplification factor A of the inverting amplifier 13, a resistance Rf of the feedback resistor, CpD as the value of the parasitic capacitance 15 and CA as the value of the input capacitance in the photoelectric converting circuit, an upper cut-off frequency $fc_1$ of the frequency characteristics of the photoelectric converting circuit is approximated by the following equation.

$$fc_1 \approx |A|/\{2\pi(CpD+CA)Rf\} \quad (1)$$

FIG. 3 (PRIOR ART) shows another conventional photoelectric converting circuit configuration wherein the same negative feedback type transimpedance method as that of FIG. 2 has been adopted. In the case of the circuit of FIG. 3, an amplifier 21 providing a gain of 1 is connected between the anode of the light receiving element 11 and the inverted amplifier 13. The output voltage of the amplifier 21 is further applied to the cathode of the light receiving element 11 through a capacitor 22. Moreover, a resistor 23 is connected between the cathode of the light receiving element 11 and the power supply 12.

Light receiving element 11 in that circuit is provided with positive feedback, by a bootstrap feedback arrangement. Since the a.c. voltage on the anode side of the light receiving element is applied to the amplifier 21 with a gain of unity (1) and the output is applied to the cathode of the light receiving element 11 through the capacitor 22, the a.c. potential applied across the light receiving element 11 becomes equal. Consequently, the potential difference between both ends of the parasitic capacitance is always zero. Thus the parasitic capacitance 15 will not affect the frequency characteristics of the photoelectric converting circuit.

Given CA' as the value of the input capacitance 24 of the amplifier 21 shown by the short dashes line, the upper cut-off frequency $fc_2$ of the photoelectric converting circuit is approximated by the following equation:

$$fc_2 \approx |A|/(2\pi CA'Rf) \quad (2)$$

The comparison of Eqs. (1) and (2) shows the fact that the value CpD of the parasitic capacitance 15 in Eq. (2) has been cancelled and thus $fc_2 > fc_1$. Accordingly, the photoelectric converting circuit of FIG. 3 is obviously more suitable than that of FIG. 2 for broadband applications.

FIG. 4 (PRIOR ART) shows a circuit configuration employing a field effect transistor 31 corresponding to the amplifier 21 shown in FIG. 3 (PRIOR ART). The drain terminal of the field effect transistor 31 is connected to the power supply 12 and one end of the resistor 23; the gate terminal to the anode of the light receiving element 11 and one end of the feedback resistor 14; and the source terminal to one end of a source resistor 32, the input of the inverted amplifier 13 and one end of the capacitor 22.

Use of a source follower field effect transistor 31 as the amplifier 21 is widely known to be effective. The source follower circuit of a field effect transistor has a gain close to 1 and besides the gain will never exceed 1. Moreover, the advantage is that the input capacitance of the source follower circuit can be made smaller than that of an emitter follower circuit using a bipolar transistor and thus a wider frequency band is available.

The upper cut-off frequenc $fc_2$ in the negative feedback transimpedance type photoelectric converting circuit utilizing the bootstrap of FIG. 3 is expressed by Eq. (2) to define the gain of the amplifier at the initial stage as 1 and the output impedance as zero. But that definition is limited to an ideal case. However, the upper cut-off frequency $fc_2$ in the actual circuit is expressed by the following equations;

$$fc_2 = Au \cdot |A|/[2\pi\{(1-Au)CpD+CA'\}Rf] \quad (3\text{-}1)$$

$$Au = Gu/\{1+(Zo/Zi)\} \quad (3\text{-}2)$$

where Gu=non-loaded voltage gain of the amplifier 21; Zo=output impedance of the amplifier 21; and Zi=input impedance of the inverted amplifier 31.

In the equation (3-2), given Gu=1, Zo=0, then Au=1, and in the equation (3-1), $$fc_2 \approx |A|/(2\pi CA'Rf)$$

which becomes equal to $fc_2$ given by Eq. (2).

However, when the source follower circuit by the field effect transistor 31 as the amplifier 21 is used, no conditions satisfying Gu=1, Zo=0 are established, i.e., given Rs as the value of the source resistance 32 of the source follower circuit and gm as the transconductance of the field effect transistor 31, non-loaded voltage gain Gu and the output impedance Zo of the amplifier 21 are approximated by the following equations:

$$Gu = gmRs/(1+gmRs) \quad (4\text{-}1)$$

$$Zo = Rs/(1+gmRs) \quad (4\text{-}2)$$

Substitution of Eqs. (4-1) and (4-2) into Eq. (3-2) gives $$Au \approx \frac{1}{1+\left(\frac{1+Rs/Zi}{gmRs}\right)} \quad (5)$$

Gives gm=10 mS, Rs=1 KΩ, input impedance of the inverted amplifier Zi=200Ω as a general example of numerical value, Au=0.63 is obtained from Eq. 5. In case Eq. (3-1) is employed as a reference, the influence of the value CpD of the parasitic capacitance of the light receiving element 11 on the frequency characteristics will not be compensable satisfactorily. Particularly when the operating frequency is higher than tens of MHz, the input impedance Zi of the inverted amplifier 13 will decrease so that the effect of the cancellation of the parasitic capacitance 15 by means of the source follower circuit of the field effect transistor 31 decreases to a greater extent.

SUMMARY OF THE INVENTION

It is therefore an objective of the present invention to provide a photoelectric converting circuit capable of high-speed operation without being affected by the parasitic capacitance of a light receiving element in a high frequency range of tens of MHz.

In the bootstrap negative feedback type photoelectric converting circuit equipped with a field effect transistor and an inverted amplifier according to the present invention intended to solve the aforementioned problems, a bipolar transistor complementary to the field effect transistor is directly connected to the field effect transistor to form, together with field effect transistor, an amplifier whose gain is close to 1 and output impedance is small.

The amplifier comprising the field effect transistor and the bipolar transistor complementary thereto has a voltage gain further closer to 1 than that of the source follower amplifier with only the field affect transistor and its output impedance can be minimized. For that reason, the upper cut-off frequency of the photoelectric converting circuit according to the present invention becomes higher, whereby the bootstrap effect is obtainable satisfactorily even at high frequencies.

BRIEF DESCRIPTION OF THE DRAWINGS

The presently preferred embodiment(s) of the invention will be described with reference to the drawings forming a part of this application. Throughout the drawings, like reference numeral designate like or corresponding parts.

DETAILED DESCRIPTION OF THE PREFERRED EMBODIMENT(S)

The following is a detailed description of the presently preferred embodiment(s) of the invention. These specific embodiments constitute the best mode known to the inventor at the time of the filing of this application for practicing the invention. The description of this invention, as set forth in this application including all of its parts, is intended to enable one of ordinary skill in the art to which this invention pertains to practice the invention.

Figure 1:
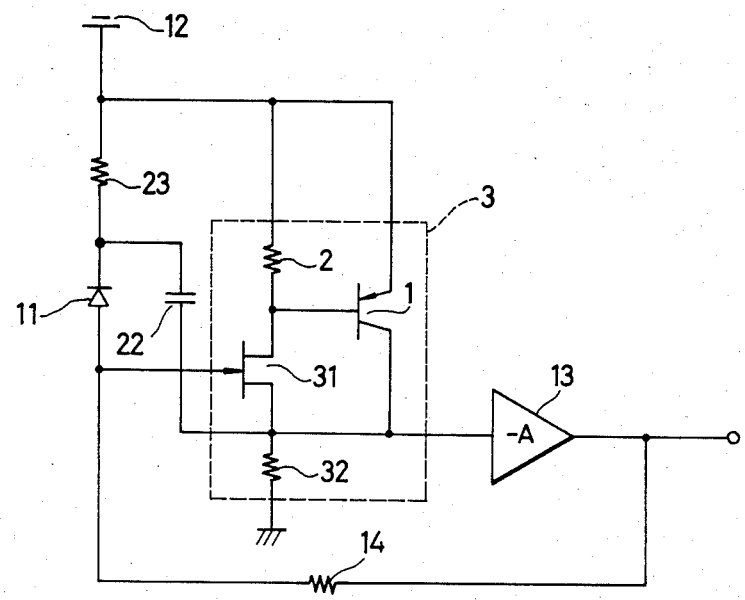
FIG. 1 is a schematic diagram circuit configuration of the present invention.
Figure 4:
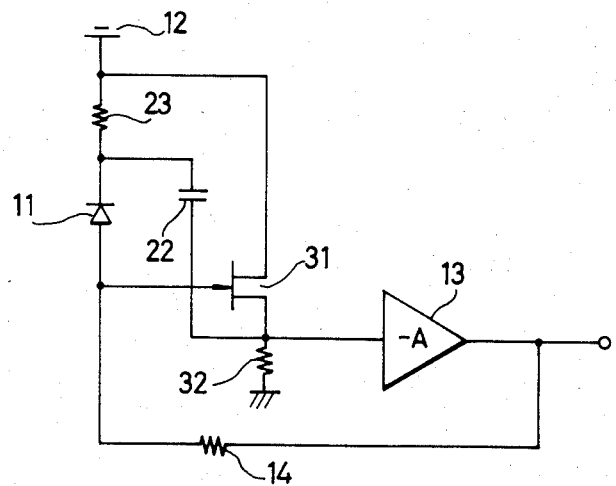
FIG. 4 is a circuit configuration using a field effect transistor as amplifier 21 in FIG. 3 (PRIOR ART).

FIG. 1 shows an embodiment of the present invention wherein like reference characters designate like elements of FIG. 4, the description of which will be omitted. In FIG. 1, the field effect transistor 31 is assumed that of an n-channel type. A pnp bipolar transistor 1 complementary to the field effect transistor 31 is directly connected to the field effect transistor 31; i.e., the base of the bipolar transistor 1 is connected to the drain terminal of the field effect transistor 31 and one end of a resistor 2; the emitter of the bipolar transistor 1 to the positive pole of a power supply 12, one end of resistor 23 and the other end of a resistor 2; and the collector of the bipolar transistor 1 to the source terminal of the field effect transistor 31, one end of a source resistor 32, one end of a capacitor 22 and an inverted amplifier 13. The field effect transistor 31, the bipolar transistor 1, the source resistor 32 and the resistor 2 constitute an amplifier 3 shown by short dashes lines in FIG. 1. The voltage gain G'u and output impedance Z'o of the complementary source follower amplifier 3 are expressed by the following equations:

$$G'u = \frac{\left(1 + \beta \frac{Rd}{Rd + r}\right) gm \cdot Rs}{1 + \left(1 + \beta \frac{Rd}{Rd + r}\right) gm \cdot Rs} \quad (6\text{-}1)$$

$$Z'o = \frac{Rs}{1 + \left(1 + \beta \frac{Rd}{Rd + r}\right) gm \cdot Rs} \quad (6\text{-}2)$$

where $\beta$=current amplification factor of the bipolar transistor 1; r=input resistance when the emitter of the bipolar transistor 1 is grounded; and Rd=value of the resistor 2.

Comparison of Eqs. (6-1), (6-2) and Eqs. (4-1), (4-2) reveals the transconductance g'm of the amplifier 3 is equivalent to $(1+\beta\, Rd/Rd+r)$ times the transconductance of the field effect transistor 31 of FIG. 4. Given $\beta$=50, Rd=r and gm=10 mS as an example of numerical value, g'm=260 mS is obtained from the calculation of the transconductance and the value thus obtained is 26 times the gm. Given gm=260 ms, Rs=1 KΩ and Zi=200Ω, the calculation of Au brings Au=0.98. This value is far greater than 0.63 of Au obtained in the same manner from the calculation of FIG. 4 and consequently the upper cut-off frequency is caused to increase when Eq. (3-1) is taken into consideration and the effect resulting from bootstrapping is improved. As the output impedance Z'o and the voltage gain G'u are thus respectively decreasable and increasable according to Eqs. (6-1) and (6-2), the influence of the parasitic capacitance of the light receiving element 11 can be nullified in a high frequency range of higher than tens of MHz.

Figure 2:
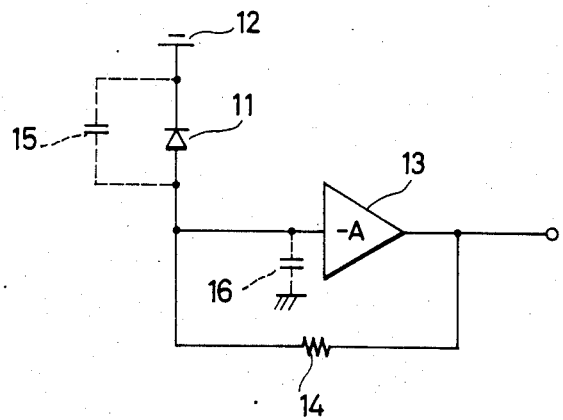
FIG. 2 (PRIOR ART) is a conventional photoelectric converting circuit configuration.
Figure 3:
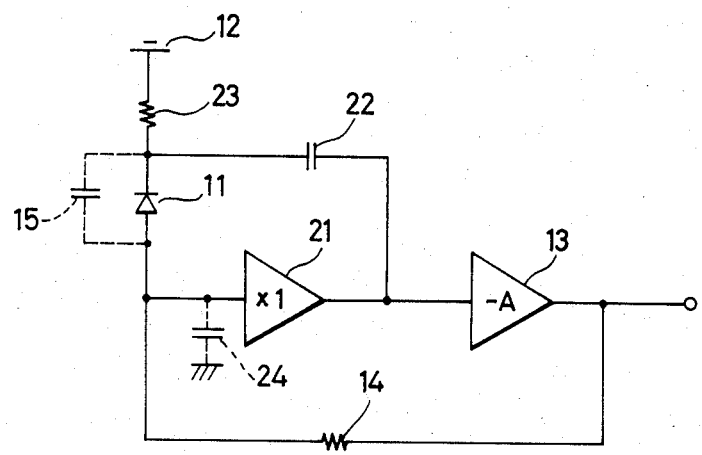
FIG. 3 (PRIOR ART) is another conventional photoelectric converting circuit configuration.

Given $C_A$ as the value of the input capacitance of the inverted amplifier 13, $C_A = C'_A = 1$ pF as the value $C'_A$ of the input capacitance of the photoelectric converting circuit 31, CpD=2 pF as the value of the parasitic capacitance of the light emitting element 11, Zi=200Ω as the input impedance of the inverted amplifier 13, Rf=10 KΩ as the value in the feedback resistor 14, $|A|=10$ as the gain of the inverted amplifier 13 and the aforementioned numerical values as the rest, the calculation of the upper cut-off frequency in each of the photoelectric converting circuits of FIGS. 1, 2 and 4 was attempted. The results obtained were 150 MHz in the case of the present invention of FIG. 1, 53 MHz in the case of the conventional circuit of FIG. 2 and 58 MHz in the case of the conventional circuit of FIG. 4. As is obvious from the results thus obtained, the circuit of the embodiment of the present invention of FIG. 1 is capable of increasing the upper cut-off frequency to a greater extent.

Although the amplifier 3 was composed of the n-channel type field effect transistor 31 and the pnp type bipolar transistor 1 in the aforementioned example, the amplifier 3 may be composed of a p-channel type field effect transistor and an npn bipolar transistor complementary thereto.

The photoelectric converting circuit according to the present invention is capable of satisfactorily cancelling parasitic capacitance of the light receiving element by means of the bootstrap effect and functioning in a frequency range of as high as tens of MHz or higher. Accordingly, the circuit is fit for use in large capacity, high-speed data communications using optical fibers.

Figure 5A:
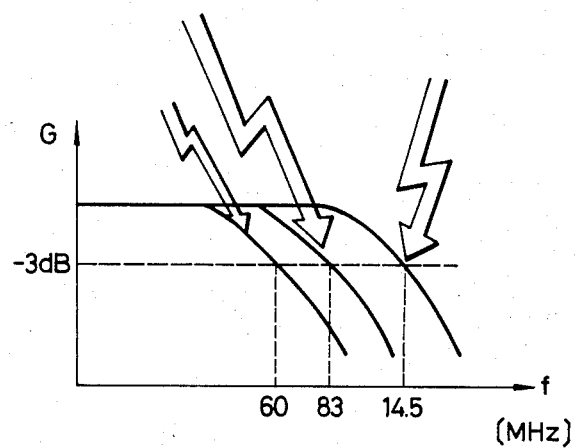
FIG. 5(a) is a schematic diagram of an FET circuit.
Figure 5B:
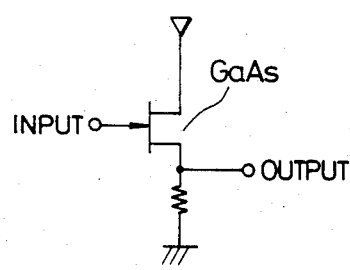
FIG. 5(b) is a schematic diagram of an FET circuit with the addition of a bipolar transistor.
Figure 5C:
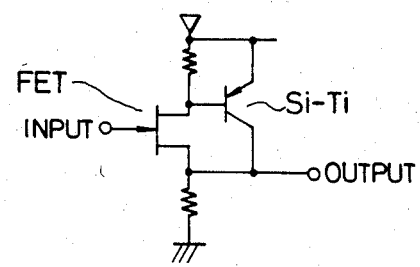
FIG. 5(c) is a graph showing comparative frequency responses of a conventional circuit, an FET circuit, and an FET circuit with an additional bipolar transistor.

FIG. 5(a) is a schematic diagram of an FET circuit. FIG. 5(b) is a schematic diagram of an FET circuit with an added bipolar transistor. FIG. 5(c) is a graph showing comparative frequency response of a conventional photoelectric converting circuit, an FET circuit without and with the added bipolar transistor.

Figure 6A:
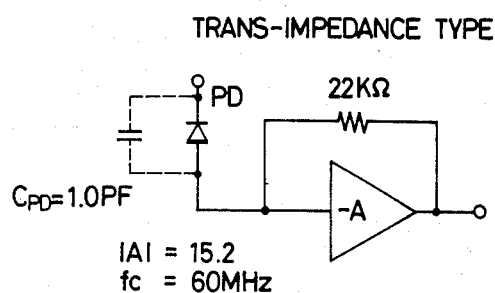
FIG. 6(a) shows a conventional photoelectric converting circuit with an fc=60 MHz, along with a graph of its frequency response.
Figure 6A:
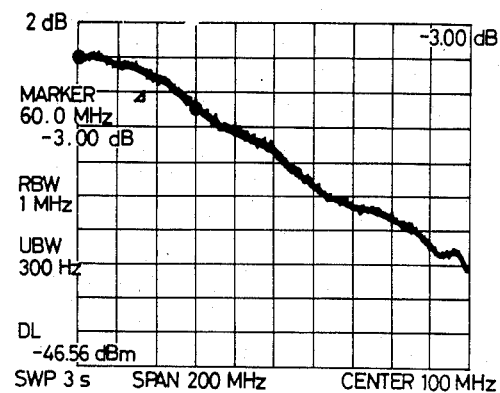
Figure 6B:
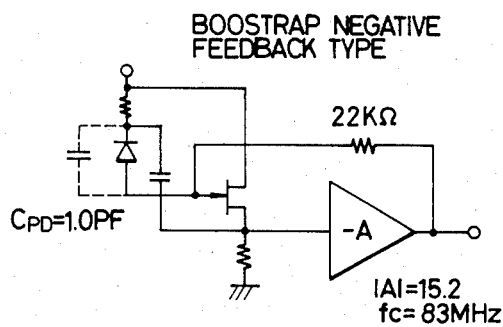
FIG. 6(b) shows a conventional photoelectric converting circuit with an FET added and operated with an fc=83 MHz and a graph of its frequency response.
Figure 6B:
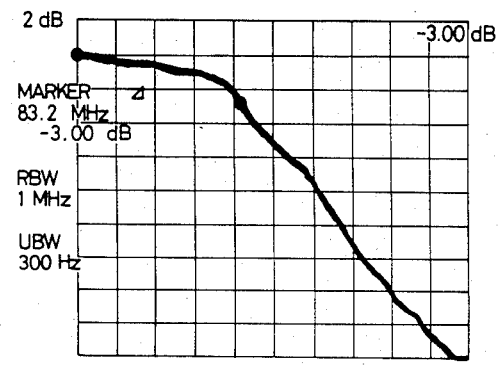
Figure 6C:
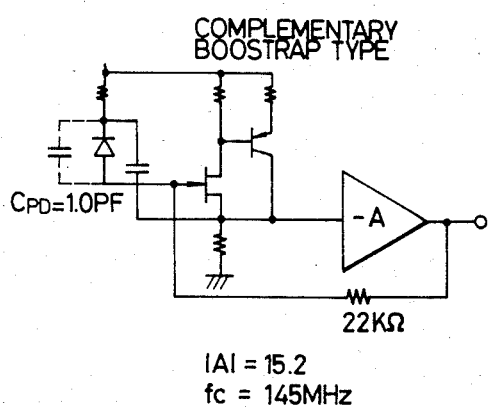
FIG. 6(c) shows a circuit diagram of the present invention using the additional bipolar transistor and a graph of the frequency response of the circuit.
Figure 6C:
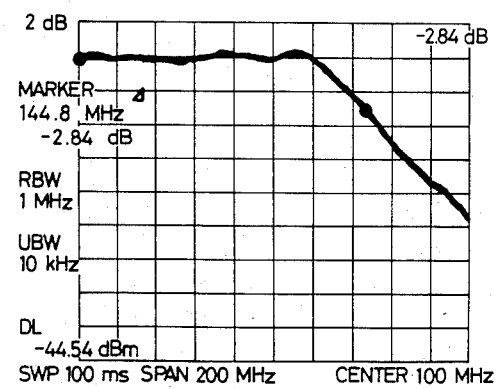

FIGS. 6(a) to 6(c) show comparative test results. FIG. 6(a) shows a conventional photoelectric converting circuit with an fc=60 MHz, along with a graph of its frequency response. FIG. 6(b) shows a conventional photoelectric converting circuit with an FET added and operated with an fc=83 MHz and a graph of its frequency response. FIG. 6(c) shows a circuit diagram of the present invention using the additional bipolar transistor and a graph of the frequency response of the circuit. As shown in the graphs, the response is flat over a wider frequency range than with either of the prior art configurations.

Other embodiments and modifications of the present invention will be apparent to those of ordinary skill in the art having the benefit of the teachings presented in the foregoing description and drawings. It is therefore to be understood that this invention is not to be unduly limited and such modifications are intended to be included within the scope of the claims.

I claim:

1. A bootstrap photoelectric converting circuit comprising:
   a light receiving element with a first end connected to a power supply through a resistor,
   a field effect transistor (FET) coupled in source follower arrangement, having a gate input terminal connected to a second end of said light receiving element,
   an inverting amplifier for inversely amplifying the output of said FET,
   a feedback resistor coupling an output of said inverting amplifier to the gate input of said field effect transistor,
   a capacitor for applying an a.c. output signal component of said FET to one end of said light receiving element, and
   a bipolar transistor connected complementary to said FET to cause said amplifier to have a substantially unity gain and a small output impedance to reduce the influence of capacitance parasitic on said light receiving element on the frequency characteristics of said photoelectric converting circuit.

* * * * *